United States Patent Office 3,287,441
Patented Nov. 22, 1966

3,287,441
MELT-SPINNABLE COMPOSITION OF A POLY(N-VINYL AMIDE) AND A POLYMER FROM THE CLASS CONSISTING OF POLYAMIDES, POLYUREAS, AND POLYURETHANES
Eugene Edward Magat, Wilmington, Del., assignor to E. I. du Pont de Nemours and Company, Wilmington, Del., a corporation of Delaware
No Drawing. Filed June 8, 1965, Ser. No. 462,392
10 Claims. (Cl. 260—857)

This application is a continuation-in-part of application Serial No. 8,586 filed February 15, 1960, now abandoned, and application Serial No. 177,277 filed March 5, 1962.

This invention relates to a novel and useful melt blend of condensation and addition polymers. More particularly, it relates to preparing melt blends of an amide type condensation polymer and a poly(N-vinyl amide), which may be melt-spun to highly dyeable filaments of textile deniers.

An object of the instant invention is to provide a homogeneous blend of an amide-type condensation polymer, and a linear poly(N-vinyl amide).

This and other objects will become apparent in the course of the following specification and claims.

In accordance with the present invention a melt-spinnable polymer blend is provided comprising (1) a synthetic linear fiber-forming condensation polymer characterized by recurring amide nitrogen interunit linkages as an integral part of the polymer chain, and (2) a linear water-soluble poly(N-vinyl amide) characterized by a main polymer chain consisting substantially exclusively of carbon atoms. Preferably the poly(N-vinyl amide) employed is one which remains water soluble after heating for at least 15 minutes and preferably for 90 minutes at 255° C. This is generally characteristic of a poly(N-vinylamide) having an active oxygen index (AOI), as defined hereinafter, of less than about 200 and preferably less than about 50.

When poly(N-vinyl amide) is employed having a much higher AOI, it is necessary to mix the poly(N-vinyl amide) with a precursor of the second polymer, e.g. when a blend with a fiber-forming polycarbonamide is desired, the poly(N-vinyl amide) is mixed either with the salt from which the fiber-forming polycarbonamide is formed or with the low molecular weight polycarbonamide intermediate (with a degree of polymerization less than about 40) of the melt polymerization. The process for forming such blends is described and claimed in Knospe, United States Patent No. 3,036,988 dated May 29, 1962. However, yarn from such a polymer mixture is more difficult to draw, has a greater number of broken filaments and is usually less white than when poly(N-vinyl amide) with an AOI below about 200 is used. Furthermore when the preferred poly(N-vinyl amide) is employed the two components of the blend may be mixed at any time. The presence of oxygen in the poly(N-vinyl amide) at a concentration above that prescribed as the preferred embodiment of the present invention, is believed to initiate reactions which cause branching and ultimate cross-linking of the poly(N-vinyl amide) when exposed to temperatures in excess of 255° C. for extended periods.

The preferred poly(N-vinyl amides), are the polyvinyl lactams, especially polyvinyl pyrrolidone, by reason of their improved melt stability (as compared with the poly(N-vinyl amides) which do not have a ring structure) making them suitable for melt-spinning with any condensation polymer as defined above whereas some other poly(N-vinyl amides), e.g., poly(N-methyl, N-vinyl formamide), are suitable for blending only with the lower melting polymers, e.g. poly(caproamide). The melt-spinnable composition of this invention not only provides a means for producing highly dyeable filaments of amide-type condensation polymer, but these filaments are, in addition, more uniformly dyed since they are much less sensitive to variables which affect dye rate, such as draw ratio, amine ends and the like than those filaments made from unmodified polymers. Thus, even though the dye rate of the polymer is high, a property often conducive to dye streakiness, streakiness is repressed in structures made from the composition of the present invention.

By the expression "... condensation polymer characterized by recurring amide nitrogen interunit linkages as an integral part of the polymer chain" is meant a member of the class comprising polyamide, polyurethane, polyurea and the thio-analogous. The nitrogen linkages between the recurring units may be represented as

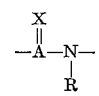

wherein

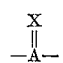

is a member of the class consisting of

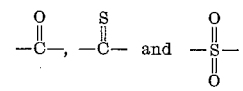

and R is hydrogen, lower alkyl and lower alkylene when the diamine has a ring structure, such as in the case of piperazine. High molecular weight fiber-forming polyamides, now well known as "nylon," are preferred in forming the product of this invention. Also included are those polymers with recurring main-chain links such as

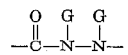

etc. The G substituents on the nitrogen are preferably hydrogen, but may be monovalent radical, preferably hydrocarbon radical.

Since the claimed composition is characterized by being "melt-spinnable to filaments of textile deniers," it is obvious that the composition must be meltable without decomposition, and that the condensation polymer component must be of fiber-forming molecular weight. Usually the condensation polymer components are those which themselves form melt-spinnable polymers.

By the term "poly(N-vinyl amide)" is meant a polymer produced by addition polymerization of an N-vinyl amide, such as an N-vinyl lactam or an N-vinyl, N-alkyl aliphatic amide, or copolymers of N-vinyl amides and one or more unsaturated monomers copolymerizable therewith, the N-vinylamide component being present in major amount. Such copolymers are limited to those in which the component other than the vinyl lactam is present in such an amount that the N-vinyl lactam copolymer remains water soluble, even after heating at 255° C., is not degraded or decomposed at polyamide melting temperatures. Moreover, the copolymer component must not react appreciably with the fiber-forming condensation polymer under melt-blending or melt-spinning conditions. Concentration limits will obviously depend on the comonomer selected. In general, copolymer components which form water-soluble homopolymers may be present in amount up to 49% of the copolymer. When the comonomer forms a water-insoluble homopolymer, it will usually be desirable to limit the comonomer to less than 30% of the copolymer.

The N-vinyl, N-alkyl aliphatic amide from which the poly(N-vinyl amide) used in the present invention is formed is described by the formula:

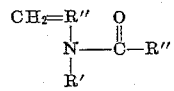

wherein R' and R" are members of the class consisting of H and lower alkyl. Preferably R' is methyl and R" is preferably H. When the N-vinyl amide has a ring structure, i.e., that of a vinyl lactam, it is represented by the formula:

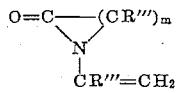

where R''' is a member of the class consisting of hydrogen and lower alykl, and $m$ is an integer between 2 and 6. The various —R—'s may be the same or different. The preferred vinyl lactams are the monomethyl substituted and unsubstituted N-vinyl pyrrolidones. The especially preferred lactam for preparing the polyvinyl lactam used in the melt-spinnable composition of this invention is N-vinyl, 2-pyrrolidone, (PVP).

The degree of polymerization (DP) of a polymer refers to the number of repeating structural units in the polymer molecule.

The term "relative viscosity" as used herein is the ratio of absolute viscosity at 25° C. (in centipoises) of the solution of polymer in 90% formic acid (10% water and 90% formic acid) to the absolute viscosity at 25° C. (in centipoises) of the 90% formic acid. In general, a relative viscosity of at least about 15 is required to provide a fiber-forming polymer which is melt-spinnable.

The active oxygen index (AOI) is determined quantitatively by the following procedure, using polyvinyl pyrrolidone (PVP) as an example of the poly(N-vinyl amide):

Five grams of polyvinyl pyrrolidone are dissolved in distilled water, and diluted to a total volume of 50 ml. After shaking to insure complete solution, two 10-ml. samples are pipetted into each of two 25-ml. volumetric flasks. One flask acts as a secondary color control. To each flask is added 5 ml. of a solution consisting of 50 ml. of concentrated sulfuric acid diluted to 500 ml. with distilled water. To the sample flask is added 5 ml. of ferrous ammonium sulfate solution (1 mg./ml.) and 5 ml. of thiocyanate solution (8.00 grams sodium thiocyanate per liter). Both flasks are then diluted to the mark with distilled water. The light absorbence of each solution at 450 millimicrons is measured using a spectrophotometer, comparing each with a reagent blank prepared by adding 5 ml. of the acid solution, 5 ml. ferrous reagent, and 5 ml. thiocyanate reagent to a 25-ml. volumetric flask and diluting to a mark with distilled water. The active oxygen present in the PVP sample oxidizes ferrous ion to ferric, producing a color with the thiocyanate. Color intensity is determined by the absorbence of light of the selected wave length, measured against a blank of the known reagent composition.

Prior to the analysis, the spectrophotometer is calibrated by measuring the absorbence of solutions of known concentrations of ferric ion, using a ferric ammonium sulfate solution (1 mg./ml.). The same concentrations of the other reagents are present when making the calibration as are present when running the analysis.

From these data, the AOI is calculated as follows:

$$AOI = 1000(\text{mg. Fe}^{III}/\text{g. PVP})$$

wherein $$\frac{5(A-B)}{\text{grms. PVP in sample}} = \text{mg. Fe}^{III}/\text{g. PVP}$$

and $A$ = concentration of Fe (III) corresponding to absorbence measured $B$ = concentration of Fe (III) corresponding to absorbence of secondary color control.

The following examples are cited to illustrate the invention. They are not intended to limit it in any manner. Compositions are given in weight percent unless otherwise noted.

EXAMPLE I

Ten percent (based on the weight of final polymer) of polyvinyl pyrrolidone (PVP) is mixed with dry hexamethylene diammonium adipate (66 salt). The composition is polymerized using the conventional cycle. Some degradation of the PVP apparently occurs, since a liquid distills off during the atmospheric pressure part of the finishing cycle. The polymer produced is somewhat yellow.

Yarn is spun from this polymer using a ½" screw melter, at a spinneret temperature of 285° C. Yarn is drawn 2.99 times its extruded length using a hot pin at 80° C. and a hot plate at 140° C. The drawn yarn, although somewhat bubbly, is not delustered, as is noted with yarn spun from nylon flake to which N-vinyl pyrrolidone is grafted.

A more homogeneous melt blend can be obtained even at lower levels of agitation when care is used to employ PVP having a relatively low AOI. Example II below illustrates typical procedures for producing such PVP and a melt blend formed therefrom.

EXAMPLE II 3 parts water are heated to boil for 10 minutes, then nitrogen is passed through the sample while cooling to room temperature. The nitrogen stream through the sample is continued for at least 2 hours at room temperature. One part distilled N-vinyl pyrrolidone (NVP) is added and the nitrogen stream continued for 2 hours. The mixture is then heated rapidly to 50° C. and 0.25% $H_2O_2$ (based on monomer) is added. The temperature is controlled at 50° C. during the reaction, then held at 50° C. for 20 hours to destroy excess hydrogen peroxide. When this polyvinyl pyrrolidone is tested, an AOI of 8 is obtained.

Similarly low AOI PVP can be made using this procedure but substituting 1% (based on the weight of the monomer) of $\alpha,\alpha'$-bisazobutyroamidine hydrochloride in place of the hydrogen peroxide.

To demonstrate the formation of the melt-spinnable composition of this invention using a low AOI PVP, dry polyvinyl pyrrolidone having an AOI of 5 is added to molten dry hexamethylene diammonium adipate at 210° C. The mixture immediately solidifies. Upon heating to 285° C. the mixture melts and after heating for 2½ hours at 285° C. in a steam atmosphere, a homogeneous, melt-spinnable polymer is produced.

Although it is preferred to use a polyvinyl amide which is substantially free from active oxygen, it has been found that when active oxygen is present in the polymer it may be removed or compensated for by the use of a suitable amount of antioxidant. For example, a polyvinyl amide which has a relatively high AOI may be made suitable by adding an anti-oxidant (for example a sodium phenyl phosphinate) to it. Thus for example, polyvinyl pyrrolidone with an AOI of 280 remains water soluble after heating 15 minutes at 255° C. with each of 1% cupric chloride, cupric acetate+potassium iodide, sodium thiosulfate, or benzoquinone. When 2% is added, diphenyl-p-phenylene diamine, mixed diaryl p-phenylene diamines, pyrogallol or sodium iodide are effective. Some of the above-disclosed inhibitors have a tendency to color formation on heating, and hence should be used only where darker colored products are not objectionable.

The relation between AOI, inhibitor concentration and water solubility after the heating test is shown in Table I below.

When the procedure is repeated, using PVP having an AOI of 280, the polymers separate into two layers as soon as stirring is stopped (just prior to extruding). From an inspection of the extruded material, it is apparent that two layers of polymers exist in the melt. The polymer first extruded is 66 nylon while the second (the upper layer) is PVP, badly degraded and dark colored. An analysis of the nylon layer shows substantially no dissolved polyvinyl pyrrolidone.

EXAMPLE IV

The melt spinnable composition of the instant invention is readily prepared in a continuous polymerization proc- TABLE I.—EFFECT OF ACTIVE OXYGEN INDEX (AOI) AND ANTIOXIDANTS ON THERMAL STABILITY OF POLYVINYL PYRROLIDONE (PVP)

| AOI of PVP | Antioxidant, Wt. Percent Based on PVP | After Heat Stability Test* | |
|---|---|---|---|
| | | Water Solubility | Color |
| 280 | None | Insoluble | Brown. |
| 122 | do | Practically insoluble | Yellow. |
| 10 | do | Soluble | White. |
| 280 | 0.05% sodium phenyl phosphinate | Insoluble | Brown. |
| 280 | 0.10% sodium phenyl phosphinate | do | Light brown. |
| 280 | 0.50% sodium phenyl phosphinate | Partially soluble | Do. |
| 280 | 0.05% sodium iodide | Insoluble | Brown. |
| 280 | 0.10% sodium iodide | do | Do. |
| 280 | 0.50% sodium iodide | Soluble | Do. |
| 280 | 0.05% diphenyl-p-phenylene diamine | do | Do. |
| 280 | 0.10% diphenyl-p-phenylene diamine | do | Do. |

*Heat Stability Test—Heat PVP in vacuum at 255° C. for 15 minutes.

Where antioxidants are to be employed, it has been discovered that they can be used to pretreat the polyvinyl amide beforehand or can be incorporated along with the amide solution in the polymerization. This latter procedure is preferred. Especially useful antioxidants are those which have been found suitable for polyamides, e.g., those disclosed by Gray in United States Patent No. 2,510,777, or by Ben and Frank in United States Serial No. 764,733. Especially advantageous results are obtained by using alkali phenyl phosphinates. Since these not only serve as antioxidants but also are nucleating agents, they increase the rate at which the polymer solidifies on extrusion. This is particularly useful when incorporating a highly hydrophilic additive, such as a polyvinyl lactam, since the yarn package is rendered thereby more stable and the yarn is more drawable. It should be noted that the characteristics of water-solubility, freedom from branching and cross-linking applies to the starting polyvinyl lactam, before mixing with the condensation polymer. After polymerization and/or melt-spinning, the product, although homogeneous (single phase) may contain some small amount of branched polyvinyl lactam.

EXAMPLE III

Polyvinyl pyrrolidone (PVP) which has a low AOI may be mixed with substantially completely polymerized polyhexamethylene adipamide (66 nylon) in the melt, as shown by this example.

A conventional 66 nylon polymerization is carried out in an autoclave equipped with a stirrer capable of vigorously agitating the polymer melt (e.g., see U.S. Patent 3,002,947). A 30% by weight solution of PVP (having an AOI of 10) in water is added to the polymer melt with vigorous agitation when the polymerization is largely complete, i.e., after the pressure has been reduced to atmospheric. After stirring for one hour at 275° C., the polymer is extruded and cut to flake, and is subsequently spun to yarn, which when drawn is of good color and mechanical quality.

ess. Thus, in a typical continuous process, 48% aqueous 66 nylon salt is fed to an evaporator where it is continuously heated to a temperature of 105° C., with the removal of steam, increasing the concentration of the salt to 55%. The concentrated salt is then fed to a prepolymerizer, through which it slowly passes forming a polymer having a low degree of polymerization, i.e., a low "D.P." polymer. The prepolymerizer is operated at a temperature of 210° C., under a pressure of 250 p.s.i. A slurry of 25% $TiO_2$ delusterant is injected into the prepolymerizer output stream to make a final polymer having a $TiO_2$ content of 0.15% by weight. Downstream from this injection point an aqueous solution containing 30% by weight PVP (having an AOI of 3 and remaining water soluble on heating at 255° C. for 1½ hours) is added, in amount to make a final concentration of 7%, based on the weight of the polymer; the latter injected solution also containing sufficient sodium phenyl phosphinate antioxidant to produce a final concentration (in polymer) of 0.55%, this additive being helpful in giving improved yarn color.

The stream of low DP polymer containing the additives specified is immediately flashed through a pressure reducing valve into a flasher-separator maintained at 280° C. and atmospheric pressure wherein steam is separated from the low DP polymer and the delusterant, PVP and other additives are well dispersed in the polymer due to the resulting high turbulence. The polymer melt is thereafter passed into a finisher vessel maintained at 285° C. and atmospheric pressure, wherein the polymer attains spinning viscosity. It is then pumped to a spinning head, where it is extruded through a sand filter pack and a spinneret bearing 34 holes. The yarn is then drawn. A finished, plain weave, 76 picks, 120 end taffeta fabric woven from the yarn has a crease set at 26 p.s.i. steam for 2 hours after which the fabric is dried and is ironed flat at 140° C., and is then soaked in water while it is free to recover. The crease recovery (wet) is found to be 98.1% compared to 83.8% for a similarly treated 66 nylon control (without PVP).

EXAMPLE V

The melt blend composition of the present invention resists loss of poly(N-vinyl amide) by extraction, contrary to blends of the same components prepared from solution. This is illustrated below.

A 46.4 gram sample of 43% aqueous polyvinyl pyrrolidone solution having an AOI of 8 is mixed with 40 ml. methanol and added to 200 grams ⅛" cut 6–6 nylon flake. After thorough mixing, the sample is dried at 60° C. under vacuum. The resulting flake is spun to yarn using a screw melter unit. The melt temperature at the spinneret is 285° C. The 5-filament yarn has a spun denier of 145. After cold drawing 4.2 times its extruded length and conditioning at 72% R.H., the following physical properties are attained.

| | |
|---|---|
| Denier | 35.2 |
| Tenacity, g.p.d. | 3.8 |
| Elongation, percent | 31.9 |
| Initial modulus, g.p.d. | 24.7 |

The extractability of polyvinyl pyrrolidone from the yarn by detergent scour and by Soxhlet extraction with water is measured. The following results are obtained.

| Extraction: | Percent PVP in final yarn |
|---|---|
| None | 8.0 |
| 90° C. detergent | 7.1 |
| Scour, Soxhlet, water | 7.2 |

Similarly another yarn sample formed from 66 nylon, PVP melt blend, wherein the PVP has an AOI of 10 and wherein the blend contains 9.76% by weight PVP, is observed to still contain 9.5% by weight PVP after extraction in boiling water for 24 hours.

As a comparative control a 20 grams sample of 66 nylon flake (35 relative viscosity) and 2 grams dry polyvinyl pyrrolidone (AOI of 10) are dissolved in 78 grams formic acid (98%). Films are cast on a glass plate using a 5 mil knife. The films are air-dried, then solvent removal is completed by drying at 50° C. in a vacuum oven. The films appear to be homogeneous.

Two film samples (coded A and B) are analyzed for polyvinyl pyrrolidone content without further treatment. Two 1-gram samples of each of these films are placed in 100 ml. portions of water containing, respectively, 0.04 gram alcohol sulfate detergent (Sample A) and 0.04 gram Na$_3$PO$_4$ (Sample B) and heated at the boiling point for 30 minutes. The samples are then washed free of salt and detergent and dried at 50° C. under vacuum. The dry films are analyzed for polyvinyl pyrrolidone content. In a second test, two 1-gram samples of the original film are Soxhlet-extracted with water for 4 hours, dried and analyzed for polyvinyl pyrrolidone. Extractability of the polyvinyl pyrrolidone from these films is shown in Table II.

TABLE II

| Treatment | PVP Content, Percent | |
|---|---|---|
| | A | B |
| None | 10.06 | 10.59 |
| Detergent Boil | 6.28 | |
| Na$_3$PO$_4$ Boil | | 6.79 |
| 4 Hour Soxhlet | 6.29 | 6.49 |

It is apparent from the above that at least one-third the polyvinyl pyrrolidone is readily extracted from solvent-cast film; similar results are obtained from solvent-cast films and dry-spun yarn of polyacrylonitrile with which polyvinyl pyrrolidone has been blended.

EXAMPLE VI

Since it is known that changes in break elongation affect the dye rate of unmodified 66 nylon, processing conditions must be very carefully controlled to avoid variations which would produce dye streaks in the final product. However, as illustrated in the present example, filaments prepared from the melt-spinnable composition of this invention have an unexpected tolerance to this variable, permitting easier processing and/or greater dye uniformity.

Polymer batches are prepared to contain four concentrations (i.e. 5%, 8.5%, 11% and 14%) of polyvinyl pyrrolidone having an AOI of 10. An unmodified 66 nylon control is also prepared. These compositions are melted, extruded through 68-hole spinnerets having Y-shaped orifices to produce Y-cross-section filaments, which are then drawn in two stages. Each sample is drawn to several elongation levels. Nominal denier of the resulting yarns is about 1020.

Circular knit tubing is prepared from each of the yarns in order to facilitate handling during dyeing evaluation. Three inch samples of the knit tubing are dyed with an aqueous dye bath (adjusted to a pH of 6.5 using ammonium hydroxide) and containing 0.25 gram per liter leveling salt (ethylene oxide-propylene oxide condensation product) and 0.25 gram per liter of the sodium salt of unsaturated long-chain alcohol sulfate, 0.5% (on weight of fabric) of the cobalt complex dye of Example III of German Patent 743,155 (1943) (known as "Perlon Fast Red 3BS"). After each fabric is in the bath for 20 minutes, the temperature is raised to 38° C., then to 50° C. after 15 minutes, then after another 15 minutes, the bath temperature is raised to a boil over a period of 30 minutes. After holding at the boil for 1½ hours, the sample is cooled, rinsed and dried. The samples are combined into 5 groups for dyeing. Each group consists of the various elongation level samples at a given polyvinyl pyrrolidone level plus a control sample (66 nylon having 8% by weight polyvinyl pyrrolidone irradiation grafted thereto by the process of U.S. 3,092,512 and a 35% elongation); each group is dyed in a separate dye bath.

The color value of the samples after dyeing is determined by measuring the percent reflectance of 555 Anstrom units on a Beckman DK–2 ratio recording spectro-reflectometer. The reflectance values are converted to $K/S$ values using the theoretical equation of Kubelka-Munk (Judd, D. B., "Color in Business, Sciences and Industry").

$$K/S = \frac{(1-R)^2}{2R}$$

where $K$ = Absorption coefficient of material, i.e., fraction of incident light lost by absorption by material.
$S$ = Scattering coefficient of material, i.e. fraction of incident light lost by scattering.
$R$ = Fractional reflectance of a colorant layer so thick that further increase in thickness does not significantly change its reflectance.

The $K/S$ values calculated for the dyed samples are then referred to the common control used in the dyeings by taking the ratio of $(K/S \text{ test})/(K/S \text{ control})$. The ratios thus obtained for the various samples can be considered equal to the relative dye rate of the samples referred to the control, since in a competitive dyeing that does not go to saturation the color obtained on a given sample is a function of its dye rate. This ratio of the $K/S$ values times 100 is arbitrarily called the percent dyeability, with the control rated at 100%.

It is apparent that a test sample which dyes as fast as its control, i.e. acquires an equivalent shade when dyed competitively in the same dye bath, would have a "percent dyeability" of 100; samples with higher dye rates would of course receive ratings greater than 100%, and vice versa. Pertinent yarn properties and dye rate data are listed in Table III.

TABLE III.—REFLECTANCE AND DYE DATA

| Sample No. | Percent PVP | Percent Reflectance 555Aº | K/S | Elong. Percent | Percent Dyeability $\frac{K/S \text{ test}}{K/S \text{ Control}} \times 100$ |
|---|---|---|---|---|---|
| Control | 8 | 0.042 | 10.90 | 35 | |
| A | 0 | 0.210 | 1.48 | 24 | 13.6 |
| B | 0 | 0.190 | 1.73 | 31 | 15.9 |
| C | 0 | 0.163 | 2.14 | 40 | 19.6 |
| D | 0 | 0.143 | 2.56 | 52 | 23.5 |
| Control | 8.0 | 0.069 | 6.3 | 35 | |
| E | 5.2 | 0.140 | 2.64 | 31 | 41.9 |
| F | 4.9 | 0.123 | 3.14 | 36 | 49.8 |
| G | 5.2 | 0.106 | 3.76 | 50 | 59.7 |
| Control | 8.0 | 0.072 | 5.94 | 35 | |
| H | 8.4 | 0.130 | 2.92 | 28 | 49.2 |
| I | 8.5 | 0.120 | 3.24 | 42 | 54.5 |
| J | 8.6 | 0.100 | 4.04 | 58 | 63.2 |
| Control | 8.0 | 0.100 | 4.04 | 35 | |
| K | 11.0 | 0.116 | 3.38 | 35 | 83.7 |
| L | 10.5 | 0.113 | 3.49 | 40 | 86.5 |
| M | 10.5 | 0.103 | 3.90 | 64 | 96.5 |
| Control | 8.0 | 0.190 | 1.73 | 35 | |
| N | 14.3 | 0.183 | 1.82 | 34 | 105 |
| O | 14.0 | 0.180 | 1.87 | 41 | 108 |
| P | 14.3 | 0.170 | 2.02 | 58 | 117 |

The percent dyeability of the test items is plotted against elongation. From the curves representing these relationships, values were read giving a mean percent dyeability for each polyvinyl pyrrolidone content at selected elongations.

Since only yarns within the elongation range of 25% to 45% are considered practical for textile end uses, the variation in percent dyeability within this range are of major interest; hence, representative dye rates at 25%, 35% and 45% elongations are listed in Table IV. The table also lists the percent change in dye rate produced by an elongation change of minus 10% or plus 10% from the mean of 35%.

TABLE IV

| PVP Level | Percent Dyeability | | | Percent Change Dye Rate From 35% Elong. Value | |
|---|---|---|---|---|---|
| | 25% Elong. | 35% Elong. | 45% Elong. | 25% Elong. | 45% Elong. |
| 0(66) | 14 | 17.2 | 21.2 | −18.5 | +23 |
| 5% | 41.9 | 48.3 | 55.7 | −12.8 | +15.3 |
| 8.5% | 48.6 | 51.6 | 56.0 | −5.8 | +8.5 |
| 10.5% | 81.6 | 84.2 | 88 | −2.7 | +4.5 |
| 14% | 102.3 | 105.2 | 110 | −2.7 | +4.5 |

It is evident from the data presented in Table IV that polyvinyl pyrrolidone modified nylon at polyvinyl pyrrolidone levels of 5% to 14% exhibits less percentage change in dye rate over the range of elongation from 25% to 45% than unmodified 66 nylon. Because commercial yarn production always involves some fluctuation in product yarn elongation and an accompanying dye rate fluctuation, this data shows that polyvinyl pyrrolidone modified nylon is more uniformly dyeable than 66 nylon.

The uniformity of the yarn of the polymer of the present invention illustrated above is readily visible to the naked eye in certain types of carpet constructions when these are compared against comparative controls. Thus a single-phase composition of 66 nylon polymer containing 8% (by weight) polyvinyl pyrrolidone having an AOI or 10, 0.55% sodium phenyl phosphinate and 0.3% $TiO_2$ (relative viscosity of polymer 48.0) is melted in a screw extruder, from which it is pumped through a filter to a 68-hole spinneret having holes of Y cross-section to produce a spun yarn which is then drawn in two stages, the first of 3.1 and a second of 1.4, giving a total effective draw ratio of 4.3. The final yarn has a denier of 1109, a tenacity (g./den.) of 4.3, and elongation of 31.1% and an initial modulus (g./den.) of 25.6.

This yarn is textured or bulked by passing through a steam jet, operated at 70 p.s.i. and 250° C., as described by Breen and Lauterbach in Belgian Patent 573,230. The denier of the bulked yarn is 1300.

The bulked yarn is given 1.5 turns Z twist, three ends are plied together and the resulting yarn is given 2 turns S twist. The denier of the final plied yarn is 3900. This yarn is tufted into a loop pile carpet having a greige weight of 23 oz./yd.$^2$ using a 12 ounce jute backing. The greige carpet is scoured at 82° C. in 0.25% (based on weight of fabric) detergent solution for 30 minutes, at a solution to fabric weight ratio of 40:1, then dyed under neutral dyeing conditions using the bath (pH 7.5–8.5) and technique described above. Examination of the carpet shows that it is dyed to a deep brilliant shade of red, and that it is substantially free from streaks. A control carpet, prepared and dyed in similar manner from 66 polymer containing no PVP showed numerous dye streaks.

EXAMPLE VII 30 grams dye hexamethylene diammonium sebacate (6–10 salt) and 2.8 grams dry polyvinyl pyrrolidone (AOI=10) are placed in a polymer tube and 30 grams of water added. The tube is purged with nitrogen at 0° C., then evacuated and sealed and heated at 215° C. for 2 hours. The prepolymer is fluid and the polyvinyl pyrrolidone is completely dissolved in the prepolymer solution. The tube is cooled and opened, then purged with nitrogen and heated at 285° C. under 1 atmosphere of steam for 2½ hours. The final polymer mixture is homogeneous and melt-spinnable.

When the procedure is repeated, using dry salt prepared from diamines and dibasic acids listed in Table V, the polyvinyl pyrrolidone dissolves in the prepolymer, and the final polymer mixture is homogeneous and melt-spinnable.

TABLE V

| Diamine | Dibasic Acids |
|---|---|
| p-Xylylene diamine | Azelaic. |
| m-Xylylene diamine | Adipic. |
| 4,4'-diaminocyclohexylmethane | Azelaic. |
| 4,4'-diaminocyclohexylmethane | Dodecanedioic. |
| Hexamethylene diamine | Isophthalic. |
| Hexamethylene diamine | Isophthalic/adipic (8/92). |

When the procedure is repeated using the 6–10 salt, but adding poly(N-methyl, N-vinyl formamide) instead of polyvinyl pyrrolidone, the polymerization temperature is kept below 250° C. A homogeneous polymer mixture is obtained and the mixture is melt-spinnable at temperatures below 250° C.

When the procedure is again repeated, but using a polymerization temperature of 285° C. and starting with 6-6 salt and adding poly(N-methyl, N-vinyl formamide), a dark brown polymer mixture is obtained. Thus, this poly(N-vinyl amide), while suitable for blending with lower-melting polymers such as 6 and 6-10 nylon, is not satisfactory for making color-free polymer blends which are melt-spun at temperatures substantially above 250° C. Similarly, copolymers having a low melting point may be blended with the less heat-stable poly(N-vinyl amides).

EXAMPLE VIII

This example illustrates the preparations of a homogeneous blend of polyvinyl amide and a polyurethane.

To prepare the polyurethane, 135 ml. of water and 35 ml. of 6.5% aqueous solution of sodium salt of technical lauryl alcohol sulfate are placed in a Waring Blendor. To this is added 0.10 mol sodium carbonate (10.6 g.) and 0.0525 mol hexamethylene diamine (6.1 g.) in 25 ml. benzene. To the stirred emulsion is added 0.05 mol bischloroformic ester of 1,4-butanediol (10.8 g.) and 25 ml. benzene. This mixture is stirred for 12 minutes, then sufficient acetone is added to break the emulsion.

The precipitate of polyurethane is collected, washed free from the salts, using water, and is then washed with acetone and dried under vacuum at 50° C. A total of 60 g. of the polyurethane is prepared by this procedure.

30 grams of the dry polyurethane is placed in each of two polymer tubes. To each tube is added 3 g. of dried polyvinyl pyrrolidone (AOI=8) and the products are mixed. The tubes are purged with nitrogen by repeated evacuation and flushing, and are then heated at 215° C. under one atmosphere of nitrogen. A homogeneous melt is observed.

EXAMPLE IX

This example illustrates the preparation of a homogeneous melt blend of a polyurea and a polyvinyl amide.

To a solution of 7.6 g. hexamethylene diamine and 15 cc. of m-cresol, are added 11.4 g. hexamethylene diisocyanate. The sample is placed in a polymer tube and cooled to 0° C., purged with nitrogen, evacuated and sealed. The tube is heated at 205-210° C. for 7 hours, then cooled and opened. A ten-fold excess of ethanol is then added to precipitate the polyurea, which is separated, and dried. 60 grams of polymer is prepared by this procedure.

30 grams of dry polyurea is placed in each of two polymer tubes, to which is added 3 g. of dry polyvinyl pyrrolidone (AOI=8). The dry products are mixed, and the tubes are purged with nitrogen by repeated evacuation and flushing with nitrogen. The tubes are then heated to 295° C. under one atmosphere of nitrogen. A homogeneous, single phase melt is observed.

EXAMPLE X

Copolymers of N-vinyl pyrrolidone and various monomers are prepared having the compositions listed in Table VI. These copolymers are polymerized under rigorous exclusion of oxygen. The copolymers are melt blended with poly(hexamethylene adipamide) by coating nylon flake with a solution of the additive, drying, and spinning to yarn using a screw melter.

TABLE VI

| Test | Additives | | Percent [2] |
|---|---|---|---|
| | Monomers Used | Monomer Ratio (Pts. by Weight) | |
| A | NVP [1]/styrene | 95/5 | 10 |
| B | NVP/vinyl pyridine | 85/15 | 12 |
| C | NVP/vinylidene chloride | 90/10 | 15 |
| D | NVP/methoxydecaethyleneoxy methacrylate | 75/25 | |

[1] NVP=N-vinyl pyrrolidone.
[2] Percent of additive based on weight of fiber.

Compared to yarn containing only a corresponding amount of PVP, drawn yarn from test B shows increased affinity for acid dyes, yarn C shows decreased flammability, and yarn D has decreased static propensity.

Characteristics of the polymer mixture

By being "melt-spinnable and drawable to yarn of textile deniers" is intended that the yarn be melt-spinnable and drawable to 50 denier per filament and preferably to about 20 or less denier per filament. This requires the use of filtering packs of fine sand to remove gelled particles, and spinneret orifices of the order of a few thousandths of an inch in diameter in order to produce suitably small filaments, as is well known to those skilled in the art. If a high degree of filtration is not provided, it is well known that gelled particles will be extruded with the yarn which will interrupt spinning or cause breaks during the drawing operation. The compositions defined herein provide a single phase melt, free from insoluble particles. If a branched, insoluble poly(N-vinyl amide) is employed, even if highly dispersed, difficulties are encountered with plugging of the filter pack or spinneret; in addition, filaments break during drawing. Additionally, small poly(N-vinyl amide) particles are prone to produce deep-dyeing specks in the drawn yarn.

Process for preparing the melt spinnable mixture

The composition of the instant invention is prepared with preservation of melt-spinnability of the polymer mixture by (1) selecting a suitably pure N-vinyl amide monomer; (2) polymerizing it under conditions which prevent oxidation of the poly(N-vinyl amide) and (3) dispersing the poly(N-vinyl amide) in the condensation polymer so that a homogeneous, single phase solution is produced, which may then be melt-spun directly. If an intermediate flake product is produced, subsequent melting and spinning to textile filaments is carried out under such conditions as to minimize the time the mixture remains molten, avoiding catalysts (e.g., $O_2$) likely to cause branching of the poly(N-vinyl amide), and preferably in the presence of an antioxidant.

Amide nitrogen condensation polymer

The condensation polymer suitable for making the melt spinnable composition of this invention is characterized by recurring amide nitrogen interunit linkages as previously discussed. The genus includes both homopolymers and copolymers.

The preferred class of polymers useful in the process of this invention are the polyamides, especially those which are water insoluble. Among suitable polyamides are those prepared by reactions of diamines and dicarboxylic acids and polyamides prepared from amino acids or their lactams, e.g., as disclosed in United States Patent Nos. 2,071,261; 2,071,253; 2,071,250; 2,130,253; 2,130,- 948; 2,163,636; 2,241,322; 2,241,323 and 2,241,321. In preparing such polyamides, a valuable class of diamines is that of the general formula:

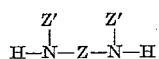

wherein $Z'$ is a member of the class consisting of alkyl and hydrogen and $Z$ is a divalent hydrocarbon radical free from aliphatic unsaturation having a chain length of at least carbon atoms. Especially useful are such diamines in which $Z$ is alkylene and contains no more than about 10 carbon atoms. The alkylene chain $Z$ may be subsitituted, especially with lower alkyl, or unsubstituted, e.g., tetramethylene diamine, hexamethylene diamine, 2-methyl hexamethylene diamine, octamethylene diamine or decamethylene diamine.

Hydrocarbon radical $Z$ may also be divalent aryl, aralkyl of cycloaliphatic. Typical diamines of this type are p- or m-phenylene diamine, p- or m-xylene diamine, 1,4- and 1,3-cyclohexane-bis(methylamine), 4,4'-diamine-odicyclohexylmethane, and the like. In addition, diamines of the general formula:

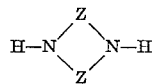

wherein Z is divalent hydrocarbon, are also useful. Piperazine and its alkyl-substituted derivatives are representative and preferred. In addition, the above indicated piperazines may be N-substituted with amino alkyl, such as, for example N,N'-aminopentyl piperazine.

To react with such diamines dicarboxylic acids of the general formula:

HOOC—Z″—COOH wherein Z″ is zero or a divalent hydrocarbon radical free from aliphatic unsaturation. Typical members of this group are oxalic acid, succinic acid, adipic acid, azelaic acid, sebacic acid, isophthalic acid, terephthalic acid, hexahydroterephthalic acid, 1,4- and 1,3-cyclohexane dicarboxylic acid. Especially useful within this group are such dicarboxylic acids wherein Z″ is alkylene and contains at least 3 and not more than 18 carbon atoms. The polyamide-forming intermediates should be combined so as to produce melt-spinnable polyamides of copolyamides.

Polyamides of the type described above are polycarbonamides wherein the amide linkages are an integral part of the main polymer chain. They have repeating units from the class consisting of:

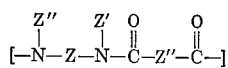

wherein Z, Z' and Z″ are as defined above and

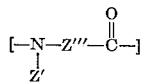

wherein Z' is as defined above and Z‴ is divalent hydrocarbon, preferably alkylene containing from 3 to 11 carbon atoms, e.g., the nylon prepared by polymerization of omega-amino caproic acid or its lactam epsilon-caprolactam and the nylon from omega-amino undecanoic acid.

*Polyvinyl lactams*

The preferred poly(N-vinyl amides) useful in forming the composition of the present invention are the polyvinyl lactams such N-vinyl pyrrolidone, N-vinyl-valero-lactam, N-vinyl caprolactam, and homologously related compounds obtained by lower alkyl substitution of the ring. The particularly preferred polyvinyl lactams are those prepared by polymerizing substituted or, preferably, unsubstituted N-vinyl 2-pyrrolidone.

The molecular weight of the polyvinyl lactam may vary over a wide range. For instance polyvinyl pyrrolidone is suitable when its average molecular weight is within the range of from about 10,000 to about 360,000. The blends of this invention may contain between 0.01 and 30% polyvinyl lactam, although for special uses, such as two-polymer component fibers, 50 to 75% of the polyvinyl lactam may be used.

Water-solubility of the poly(N-vinyl amide) to the extent previously described is important to avoid formation of a highly branched or cross-linked structure which would interfere with the melt-spinnability of the final composition. It is believed that the branching reaction, leading to insolubility, is catalyzed by peroxides present in the vinyl amide, particularly polyvinyl lactam. These may be polymerization catalyst residues, or may be present because oxygen was not rigorously excluded during polymerization of the lactam. Thus, polyvinyl lactams with an AOI of 200 or less are operable, with 50 and below preferred.

As already mentioned, and shown in Example X, it may be desirable to include one or more copolymer components in polymerizing the N-vinyl amide to be blended with the amide-type condensation polymer; such components may be added to improve antistatic effect, hand, tenacity, flame resistance, soil repellence or the like. Such components will usually be present in lesser amounts than that of the vinyl amide employed. These copolymer components, if present, must be free from functional groups which decompose or react under processing conditions with the amide-type condensation polymer; if this precaution is not observed, a branched and/or cross-linked melt will be obtained which will be unspinnable.

Many equivalent modifications will be apparent to those skilled in the art from a reading of the above without a departure from the inventive concept.

What is claimed is:

1. In a single phase melt-spinnable composition consisting essentially of (1) a synthetic linear fiber-forming condensation polymer from the class consisting of a polyamide, a polyurethane and a polyurea, the said polymer being characterized by recurring amide nitrogen interunit linkages as an integral part of the polymer chain, the said amide nitrogen interunit linkages having the formula from the class consisting of

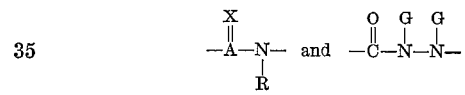

wherein

is a member of the class consisting of

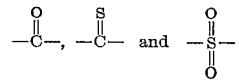

and R is hydrogen, lower alkyl and lower alkylene when the diamine has a ring structure and G is a member of the class consisting of hydrogen and lower alkyl and (2) a linear water-soluble poly(N-vinyl amide) from the class consisting of poly(N-vinyl pyrrolidone) and poly(N-methyl, N-vinyl formamide), the said poly(N-vinyl amide) being thermally stable at melt-spinning temperatures.

2. The composition of claim 1 wherein the said poly(N-vinyl amide) has an active oxygen index no greater than about 200.

3. The composition of claim 2 wherein the said active oxygen index is no greater than about 50.

4. The composition of claim 1 wherein the poly(N-vinyl amide) remains water soluble after heating in the presence of an antioxidant.

5. The composition of claim 1 wherein the said amide nitrogen interunit linkage of the condensation polymer is carbonamide.

6. The composition of claim 5 wherein the said condensation polymer is polycaproamide.

7. The composition of claim 5 wherein the said condensation polymer is polyhexamethylene adipamide.

8. A single phase melt-spinnable composition consisting essentially of (1) a synthetic linear fiber-forming polycarbonamide wherein the recurring amide linkages form an integral part of the polymer chain and (2) a linear water-soluble poly(N-vinyl amide) from the class consisting of poly(N-vinyl pyrrolidone) and poly(N-methyl, N-vinyl formamide), the said poly(N-vinyl amide) being thermally stable at melt-spinning temperatures and remaining water soluble after heating.

9. A filament formed from the composition of claim 8.
10. A film formed from the composition of claim 8.

References Cited by the Examiner

UNITED STATES PATENTS

| | | | |
|---|---|---|---|
| 2,958,677 | 11/1960 | Kleinschmidt | 260—857 |
| 3,036,988 | 5/1962 | Knospe | 260—857 |

MURRAY TILLMAN, *Primary Examiner.*

SAMUEL H. BLECH, *Examiner.*

P. LIEBERMAN, *Assistant Examiner.*